United States Patent

[11] 3,604,320

| [72] | Inventors | Alvin C. Duvall<br>2727 Southwick St., Ida, Mich. 48140;<br>James C. Jones, 3304 River Road; George<br>R. Kramp, 1249 Wildwood, Toledo, Ohio<br>43614; James L. Swickard, Jr., 735<br>Southwood Dr., Uniontown, Ohio 44685 |
|---|---|---|
| [21] | Appl. No. | 858,605 |
| [22] | Filed | Sept. 17, 1969 |
| [45] | Patented | Sept. 14, 1971 |

[54] APPARATUS FOR ASSEMBLING TUBE AND END PANEL
6 Claims, 8 Drawing Figs.

[52] U.S. Cl. .................................................. 93/55.1 R, 93/59 CE
[51] Int. Cl. .................................................. B31b 17/00
[50] Field of Search .......................................... 93/55.1, 55.1 M, 55.1 P, 59 CE, 39.1, 59

[56] References Cited

UNITED STATES PATENTS

| 2,413,449 | 12/1946 | Hatch ......................... | 93/55.1 |
| 2,966,833 | 1/1961 | Leibreich ..................... | 93/55.1 |
| 3,41,654 | 11/1968 | McCandless ................. | 93/55.1 |
| 3,468,225 | 9/1969 | Pesch et al. .................. | 93/59 X |

*Primary Examiner*—Bernard Stickney
*Attorneys*—Alan J. Steger and E. J. Holler

ABSTRACT: Novel assembly means adapted to produce a unique package particularly suited for use in conjunction with asphalt wherein a fiber bottom is sealed to a fiber tube by means of a heat and pressure sensitive adhesive. The assembly means includes three mandrels mounted on a revolving spider and a heated sealing platen. In operation, a cylindrical paper tube is placed over one of the mandrels so that its upper edge extends beyond the upper end of the mandrel. The paper tube includes approximately a one-inch strip of heat and pressure sensitive adhesive which has been coated around the inner periphery of its upper edge. A paper bottom is positioned within the upper end of the paper tube and rests against the upper end of the mandrel. Once loaded, the mandrel is rotated into a sealing position where the heated sealing platen cooperates with the mandrel to crimp the adhesive coated end of the paper tube into sealed engagement with the paper bottom. The mandrel is then revolved to a third position where the sealed package is removed from the assembly means.

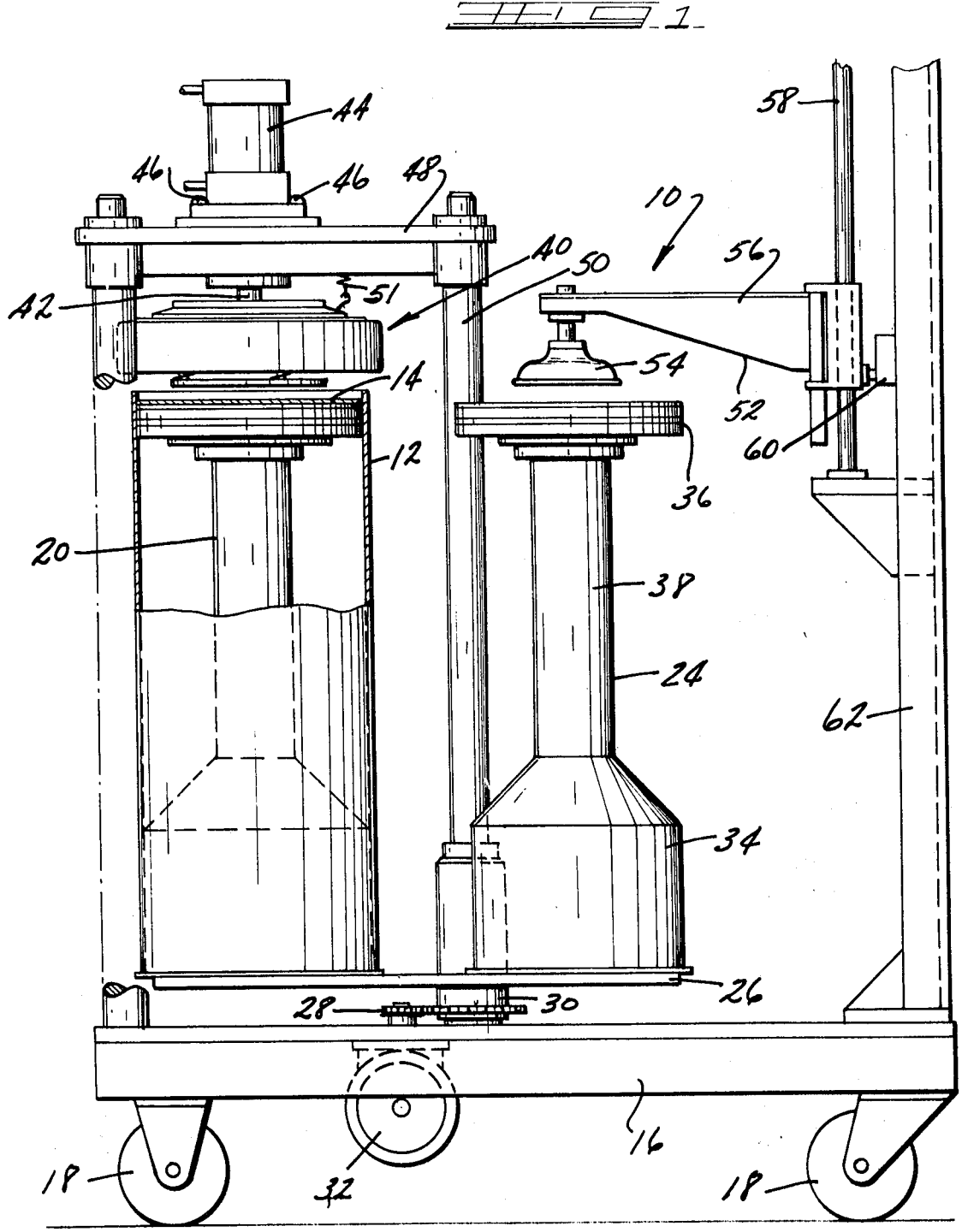

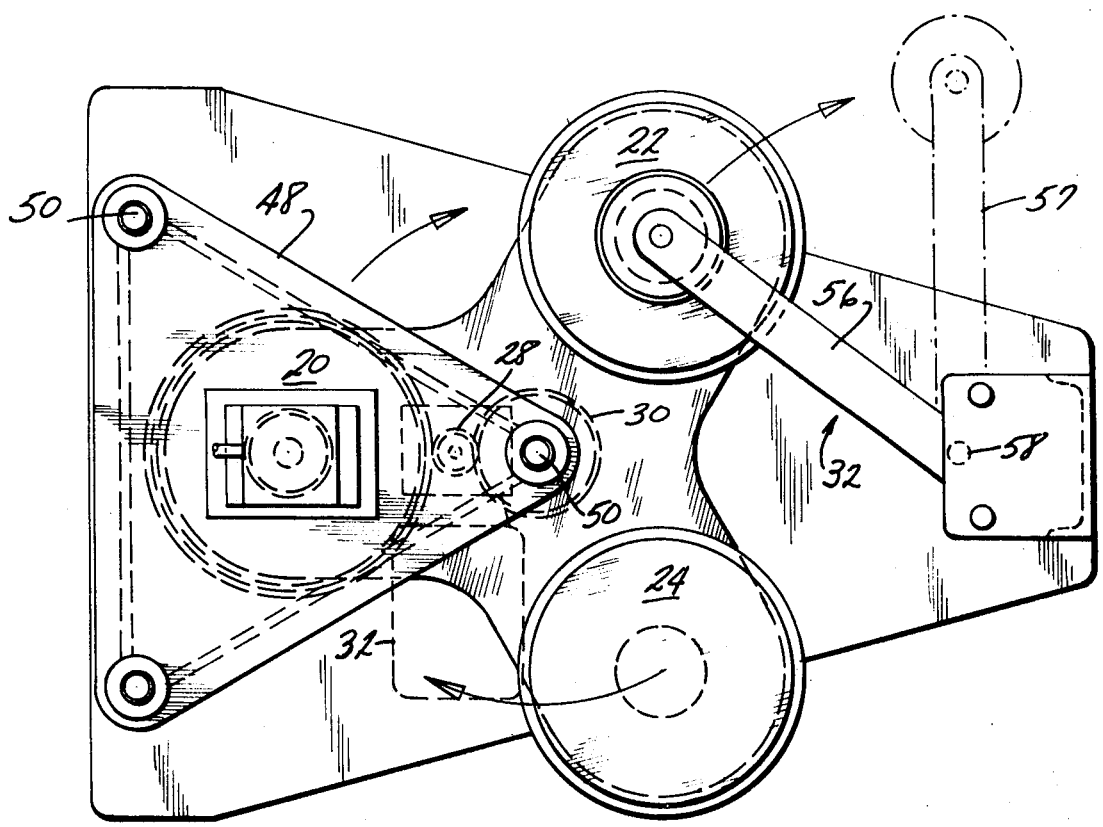

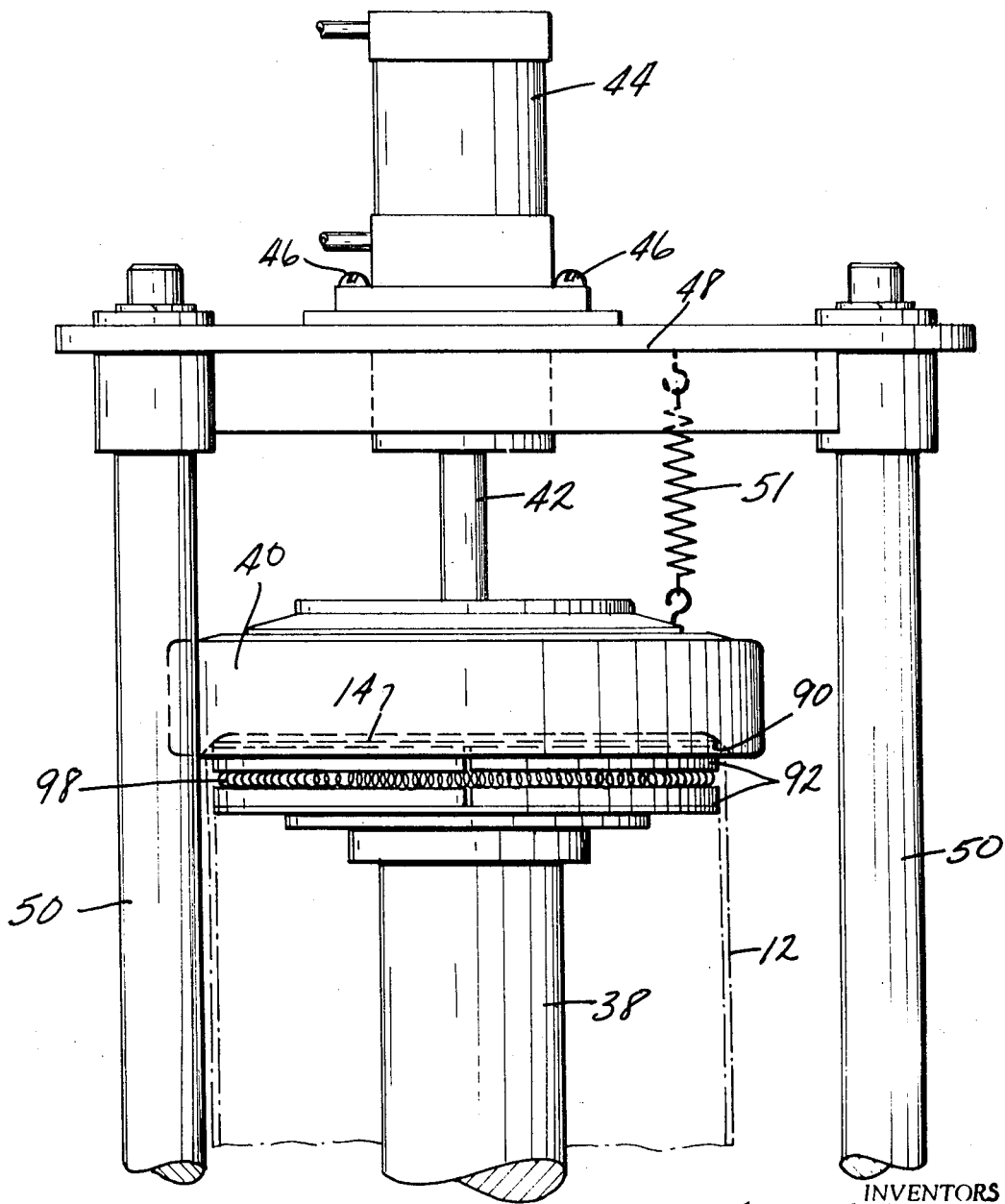

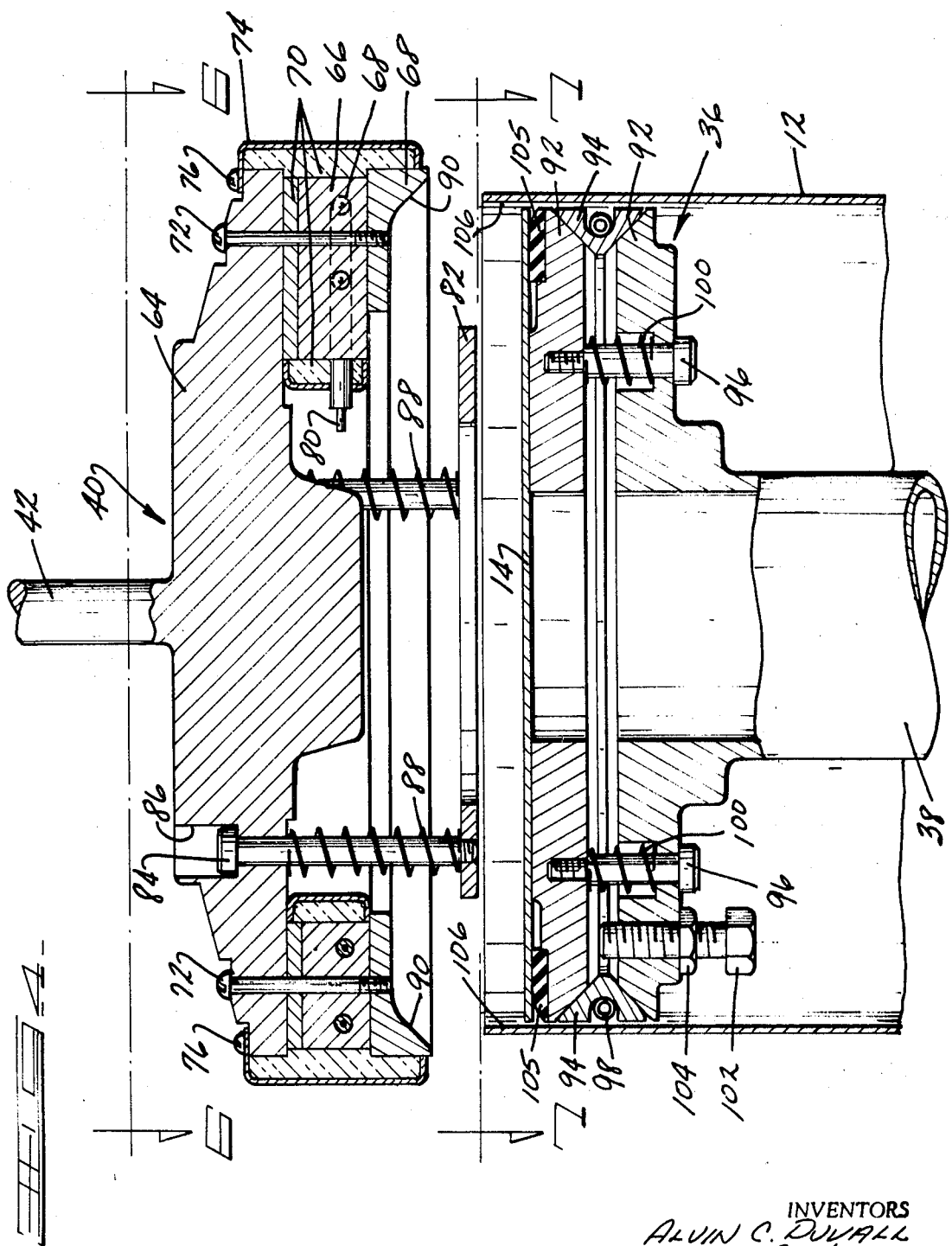

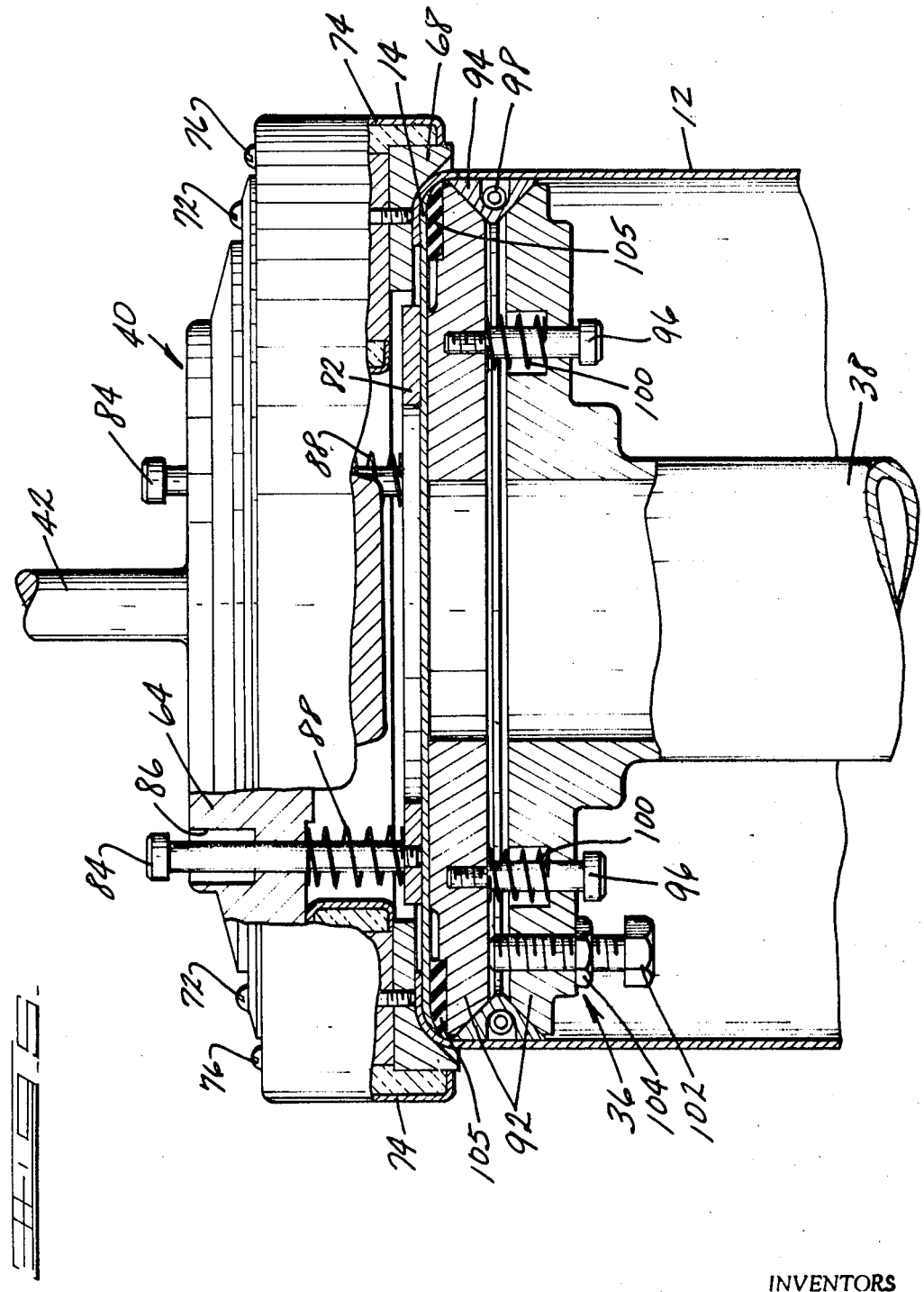

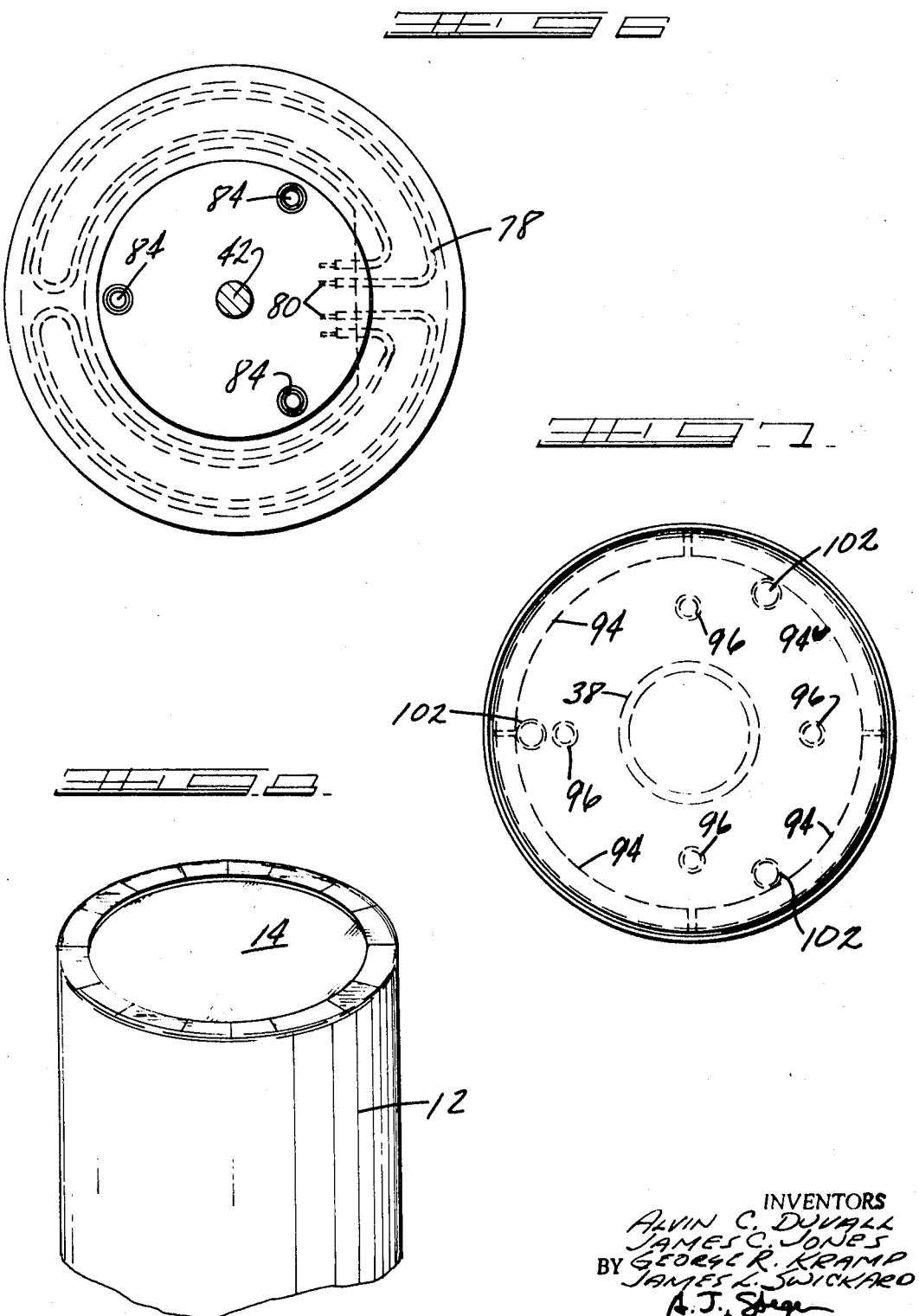

APPARATUS FOR ASSEMBLING TUBE AND END PANEL

BACKGROUND OF THE INVENTION

This invention relates to a novel assembly means adapted to produce a unique package particularly suited for containing asphalt.

The tremendous expansion of modern highways has resulted in the necessity of having large quantities of asphalt paving material shipped to the site of the highway paving or resurfacing. An ideal container for shipping asphalt has been difficult to produce due to the requirements that it be light in weight, inexpensive, able to withstand a wide range of temperatures, and be easily disposable. Therefore, many attempts have been made to produce a suitable paper container for asphalt. However, attaching a suitable bottom to such a paper container has become a persistent problem. It has been attempted to produce a suitable such package by crimping full metal bottoms onto a paper body. But this method has proven to be very expensive and difficult to handle. It also has been attempted to produce a package whereby a fiber or paper bottom is attached to the body by means of crimped metal rings. The production of such a package is extremely slow and also quite expensive. Further, such packages have been made by taping or stapling a fiber or paper bottom to a paper tube. Again, in this process the assembly procedure is slow and expensive and it has been found that variances in heat and moisture result in package failure. For example, it was found that the tape used to hold the paper bottom to the paper tube would shatter in cold temperatures. Additionally, fiber bottoms have been glued to a paper tube by activating an adhesive with steam and making momentary contact between the glued members with a wheel which also crimps the sidewall into contact with the bottom. However, such a procedure is very expensive as it is limited to the use of special steam reactive adhesives and is extremely difficult in a cold climate as the steam creates frost during the assembly procedure. Thus, the full or partial metal constructions suffer from high container costs and require elaborate complicated machinery, stapled or stitched bottoms are not fully sealed and tend to leak, and taped or stem glued bottoms are subject to failure in temperature and moisture extremes.

Therefore, it is clear that there exists an urgent need for a suitable container for packaging and shipping asphalt which solves the aforementioned problems associated with presently available asphalt packages.

SUMMARY OF THE INVENTION

It is therefore an object of this invention to provide a suitable asphalt package and the assembly means therefor which eliminate the problems associated with presently available asphalt packages.

In general, this invention provides a package having a paper bottom which is adhesively sealed to a paper tube by means of a heat and pressure sensitive adhesive. To achieve the production of this novel asphalt package, unique assembly means are provided which include three mandrels mounted on a revolving spider and a heated sealing platen adapted to coact with these mandrels to seal the paper bottom to the paper tube. In operation, a cylindrical paper tube is placed over one of the mandrels so that its upper edge extends beyond the upper end of the mandrel. The paper tube includes approximately a 1-inch strip of heat and pressure sensitive adhesive which has been coated around the inner periphery of its upper edge. A paper bottom is positioned within the upper end of the paper tube and rests against the upper end of the mandrel. Once the paper tube and paper bottom have been positioned on the mandrel in its sealing position, the heated sealing platen is lowered to coact with the mandrel to crimp the adhesive coated end of the paper tube into sealed engagement with the paper bottom. This mandrel is then revolved to a third station where the sealed package is removed from the assembly means. It should be understood that the individual steps are occurring simultaneously with respect to different containers. In other words, while one container positioned on a first mandrel is undergoing the sealing step, a second container is being removed from a second mandrel and a new paper bottom are being loaded on a third mandrel.

Other objects, features, and advantages of the asphalt container and its assembly means as provided by this invention will become obvious upon reference to the following detailed description and the drawings illustrating a preferred embodiment.

IN THE DRAWINGS

FIG. 1 is a front elevation view of the unique package assembly means of this invention.

FIG. 2 is a top view of the assembly means of FIG. 1.

FIG. 3 is a side view of a mandrel and heated sealing platen of the assembly means of FIG. 1.

FIG. 4 is an enlarged sectional view showing the details of the mandrel and heated sealing platen in their open position.

FIG. 5 is an enlarged sectional view of the mandrel and heated sealing platen of FIG. 4 in their closed or sealing position.

FIG. 6 is a top view of the heated sealing platen taken in the direction of arrows 6—6 in FIG. 4.

FIG. 7 is a top view of the mandrel taken in the direction of arrows 7—7 in FIG. 4.

FIG. 8 is a perspective view of a cylindrical package as produced by the unique assembly means of this invention.

DETAILED DESCRIPTION OF THE PREFERRED EMBODIMENT OF THE INVENTION

Referring to the drawings, FIG. 1 shows a package assembly means indicated generally by the numeral 10 adapted to sealingly assemble a cylindrical paper tube 12 to a circular paper bottom 14. The assembly means 10 is mounted on a suitable transport vehicle 16 which is movable on wheels 18.

As can be seen in FIG. 2, the assembly means 10 includes three mandrels 20, 22, and 24. The three mandrels are mounted on a rotatable spider plate 26 which is driven through geared shafts 28 and 30 by means of a suitable drive motor 32. The mandrels each include a base portion 34 and an expandable head portion 36 which are connected by means of a mandrel post 38. Each of the three mandrels 20, 22 and 24 are identical in size and structural details. A sealing platen means is generally indicated by the numeral 40 and is connected by means of shaft 42 to a hydraulic drive system 44. The hydraulic drive system 44 is fixed by means of bolts 46 to a triangular platform 48 which is supported above and fixed to the vehicle 16 by means of three tie rods 50. The heated sealing platen 40 is also held by three restraining springs 51 which serve to hold the platen 40 away from the mandrel head 36 during periods when the hydraulic system 44 is inactive. The structural details of the mandrel head 36 and the sealing platen 40 will be discussed in detail in connection with FIGS. 3–7.

The assembly means 10 further includes a removal means 52 which is adapted to remove a sealed package from a mandrel. This removal means 52 includes a suction cup 54 mounted on a support arm 56 which is positioned so as to be reciprocated up and down and pivoted about the guidepost 58 by means of a suitable drive motor 60. The guidepost 58 and the motor 60 are supported by means of a vertical boom 62 which is attached at its bottom end to the vehicle 16.

Thus, the procedure of forming a cylindrical package on the assembly means 10 of this invention can be quickly understood by reference to FIGS. 1 and 2. A cylindrical paper tube and a circular paper bottom are placed over the mandrel located in the position occupied by mandrel 24 in FIG. 2. The mandrel supporting spider 26 is then rotated and indexed so that mandrel 24 is positioned under the heated sealing platen 40. The heated sealing platen 40 and the head portion 36 of the mandrel 24 cooperate to sealingly engage the paper tube 12 and the paper bottom 14. Once this sealing procedure is completed, the platform 40 is retracted upwardly and the spider 26 again rotated and indexed so that the mandrel and sealed paper tube are rotated to the position occupied by mandrel 22 in FIG. 2. At this location the removal means 52 is lowered into position so that the suction cup 54 grasps the sealed container and is able to raise it from the mandrel and pivot it to the position shown in dash-dot lines 57 in FIG. 2.

To more clearly understand the structural details of the heated sealing platen 40 and the expandable mandrel head 36, reference should be had to FIGS. 3–7. The heated sealing platen 40 includes a shell 64, a case aluminum heating element 66, and a forming pressure ring 68 which are separated by blocks of insulation material 70. These components are tied together by means of screws 72 and are protected around their periphery by means of an insulation cover 74 which in turn is attached to shell 64 by means of screws 76. As can best be seen in FIGS. 4 and 6, a calrod heating device 78 is embedded in the cast aluminum heating element 66 and provides the heat necessary to warm the forming pressure ring 68. The calrod heating device 78 is connected to a source of electrical energy by means of terminals 80. A bottom holddown plate 82 is provided slidingly attached to the shell 64 by means of sliding shoulder bolts 84 which are received in recesses 86. A coil spring 88 is positioned on shoulder bolt 84 between the bottom plate 82 and the shell 64. The forming and pressure ring 68 has a tapered inside surface 90 which acts as the actual fold-over mechanism to force the paper tube 12 into contact with the paper bottom 14.

The expanding mandrel head 36 includes a pair of tapered plates 92 which are separated by expansion shoes 94 and connected by assembly screws 96 (see FIGS. 4 and 7). The expansion shoes 94 are held in place between the tapered mandrel plates 92 by means of a garter spring 98. Thus, the garter spring 98 biases the wedge-shaped expansion shoes 94 into the space between the tapered plates 92. In FIG. 4 it can be seen that during the sealing step tapered plates 92 are forced together, thereby pushing expansion shoes 94 into tight radial engagement with the paper tube 12. The assembly screws 96 each include a release spring 100 which acts to keep the plates 92 in a separated position. Three adjustable stop screws 102 having lock nuts 104 are provided in the lower end of the tapered plates 92 and are adjustable to provide a stopping device for the upper tapered plate 92 when it is being forced downwardly by the pressure ring 68. The adjustable stop screws 102 also control the amount of radial travel of the expansion shoes 94 during the sealing operation. A layer of silicone rubber 105 is recessed within the top surface of the upper tapered plate 92 and acts as a cushioning material during the joining of the paper tube 12 and paper bottom 14.

It should be noted that the paper tube 12, when positioned over the mandrel, is sized so that a portion of its end extends beyond the upper surface of the mandrel head 36. The inside surface 106 of the extending upper end of the paper tube 12 is coated with a suitable heat and pressure sensitive adhesive. One such suitable adhesive is phenolformaldehyde modified polyvinyl acetate.

The actual folding over and sealing of the paper tube to the paper bottom can best be understood by viewing the transition from FIG. 4 to FIG. 5. After the paper tube and paper bottom have been placed in position on the mandrel, the heated sealing platen 40 is lowered by means of the hydraulic actuating system 44. As can be seen in FIG. 4, the bottom holddown plate 82 contacts the paper bottom 14 to hold it inside of the paper tube 12 against the top surface of the upper tapered mandrel plate 92. As the sealing platen 40 continues its downward movement, the inner tapered surface 90 of the pressure ring 68 contacts the upper extended edge of the paper sleeve 12. This extending edge or margin of the paper sleeve 12 follows the taper of the pressure ring 68 and is folded over into engagement with the paper bottom 14. The pressure ring 68, which is heated by means of the calrod heating elements 78, then applies a combination of heat and pressure to the paper tube to activate the heat and pressure sensitive adhesive to thereby bond the paper tubing to the paper bottom. It can be seen in FIG. 5 that the holddown plate 82 and its supporting shoulder bolts 84 retract to the position shown in FIG. 5 when the heated sealing platen 40 is performing its sealing function. The resulting package is shown in FIG. 8.

It has been found with particular adhesive suggested earlier that a temperature in the range of 350° to 550° F. has been very suitable to actuate the adhesive to form its sealing function. A particular operating temperature at which successful results have been achieved is 476° F. Further, a pressure buildup of approximately 250 p.s.i. per sq. in. of glue line between the heated sealing platen and the mandrel head has been found adequate to perform the sealing function. The amount of time necessary to complete the sealing function varies with the atmospheric conditions. If, for example, the surrounding atmospheric conditions are hot and humid, a much shorter time is necessary for adequate sealing than would be the case if the surrounding conditions were cold and dry. Thus, the lower the ambient temperature, the more time it takes to fully activate the heat and pressure sensitive adhesive. For example, in Houston Texas, in the summer, one-half second sealing time at a temperature of 475° F. and 250 p.s.i. has been found to be very satisfactory. In contrast to this, in Cleveland, Ohio, during the winter, it has been found necessary to increase the sealing time to 4 seconds for satisfactory adhesion. To insure a large sealing area, it is suggested that the adhesive be placed around a strip approximately 1 inch wide on the inside periphery of the paper tube.

It should be understood that while this invention has been described in connection with the formation of a cylindrical container, the inventive concept is equally well adapted to be used with other shapes, such as square or rectangular containers. Additionally, this type of container is especially well suited to package not only asphalt but ice cream, wood resins, and other products that are poured in the liquid state and solidified.

Thus, from the preceding, it can be seen that this invention provides a unique assembly means for accomplishing the sealing of a cylindrical paper tube to a paper bottom. The paper package thus produced on the assembly means of this invention in accordance with the conditions described herein is well suited for packaging materials such as asphalt. Previous attempts at producing a paper container for asphalt have proved unsuccessful in that the sealing means between the paper tube and the bottom either involved metal components such that the cost and assembly time were prohibitive or involved glued or stapled connections which failed under the heat or weight of the asphalt contained therein. In contrast to this, the paper container produced by the assembly means and process of this invention has proven to be very successful as a shipping container for asphalt in all different types of atmospheric conditions, Furthermore, the assembly procedure is rather simple, quick, and inexpensive. Thus, the assembly means of this invention is capable of producing lightweight and inexpensive, yet completely successful paper containers for packaging and shipping asphalt.

We claim:

1. Apparatus for assembling a cylindrical fiber tube and a circular fiber end panel into a container comprising mandrel means adapted to telescopingly support a tube and to support and position an end panel within and spaced from one end of said tube with a marginal portion of said tube extending beyond said end panel, said marginal portion of said tube having a coating of heat and pressure sensitive adhesive around its inner periphery, heated platen means positioned in facing relation to said end panel, means connected to said platen for moving said platen into engagement with said marginal portion of said tube to apply deforming pressure and heat to said marginal portion to compress it into sealed engagement with said end panel, and said mandrel means including an expandable head adapted to expand radially outward against said fiber tube to maintain the cylindrical configuration of said fiber tube under the force of said heated platen when said heated platen is moved into engagement with said marginal portion of said fiber tube and said end panel.

2. Apparatus for assembling a cylindrical fiber tube and a circular fiber end panel into a container comprising mandrel means adapted to telescopingly support a tube and to support and position an end panel within and spaced from one end of said tube with a marginal portion of said tube extending beyond said end panel, said marginal portion of said tube having a coating of heat and pressure sensitive adhesive around its inner periphery, heated platen means positioned in facing relation to said end panel, means connected to said platen for moving said platen into engagement with said marginal portion of said tube to apply deforming pressure and heat to said marginal portion to compress it into sealed engagement with said end panel, said mandrel means including an expandable head adapted to expand radially outward against said fiber tube to maintain the cylindrical configuration of said fiber tube under the force of said heated platen when said heated platen is moved into engagement with said marginal portion of said fiber tube and said end panel, and said expandable head comprising a pair of tapered platen, a plurality of wedge-shaped expansion shoes positioned in the tapered space between said plates and adapted to be moved radially outward into engagement with the fiber tube when said tapered plates are urged together under the force of the heated sealing platen, a garter spring circumferentially surrounding the expansion shoes and biasing them into engagement with said plates, and a plurality of stop screws adjustable to control the amount of movement of the tapered plates and the expansion shoes.

3. Apparatus as set forth in claim 2 wherein said heated platen means includes a forming pressure ring with a tapered interior periphery adapted to fold said marginal portion of said tube into sealing engagement with said panel.

4. Apparatus as set forth in claim 3 wherein said heated platen means further includes a calrod heating device adjacent to said forming pressure ring adapted to supply heat to said forming pressure ring.

5. Apparatus as set forth in claim 4 wherein said heated platen means further includes an outwardly biased end panel engaging retractable means for engaging said end panel prior to the engagement of said forming pressure ring.

6. A three station full overlap cycle forming machine for assembling a cylindrical fiber tube and a circular fiber end panel into a container comprising a first mandrel positioned to telescopingly support a fiber tube and to support and position an end panel within and spaced from one end of said tube with a marginal portion of said tube extending beyond said end panel, said marginal portion of said tube having a coating of heat and pressure sensitive adhesive around its inner periphery, a second mandrel, container forming means overlying said second mandrel and adapted to be moved into engagement with said marginal portion of said tube to apply deforming pressure and heat to said marginal portion to compress it into sealed engagement with said end panel, a third mandrel, container removal means positioned adjacent said third mandrel and adapted to remove a sealed container from said forming machine, means for supporting said first, second, and third mandrels equidistant from each other, means connected to said mandrel supporting means adapted to index said mandrels between said three stations, and each of said first, second, and third mandrels including an expandable head adapted to expand radially outward against said fiber tube to maintain the cylindrical configuration of said fiber tube under the force of said heated platen when said heated platen is moved into engagement with said marginal portions of said fiber tube and said end panel.

PO-1050
(5/69)

UNITED STATES PATENT OFFICE
CERTIFICATE OF CORRECTION

Patent No. 3,604,320                Dated September 14, 1971

Inventor(s) Alvin C. Duvall, James C. Jones, George R. Kramp, James L. Swickard, Jr.

It is certified that error appears in the above-identified patent and that said Letters Patent are hereby corrected as shown below:

In the heading, insert ---Assignee  Owens-Illinois, Inc. Column 1, line 42, "stem" should be --steam--; Column 3, line 23, insert --and is-- between provided and slidingly; Column 4, line 12, "476°" should be --475°--.

Signed and sealed this 6th day of June 1972.

(SEAL)
Attest:

EDWARD M. FLETCHER, JR.
Attesting Officer

ROBERT GOTTSCHALK
Commissioner of Patents